July 31, 1962 R. DALLY ET AL 3,047,676

CHANNEL AND REPLACEABLE STYLUS ASSEMBLIES

Filed April 3, 1957

INVENTORS:
GEORGE W. FABEL,
ROY DALLY,

BY Donald N. Timbie
THEIR ATTORNEY.

United States Patent Office 3,047,676

Patented July 31, 1962

3,047,676

CHANNEL AND REPLACEABLE STYLUS ASSEMBLIES

Roy Dally, Liverpool, and George W. Fabel, Fulton, N.Y., assignors to General Electric Company, a corporation of New York Filed Apr. 3, 1957, Ser. No. 650,512
14 Claims. (Cl. 179—100.41)

Figures 1, 2, 3, 4, 5, 6:
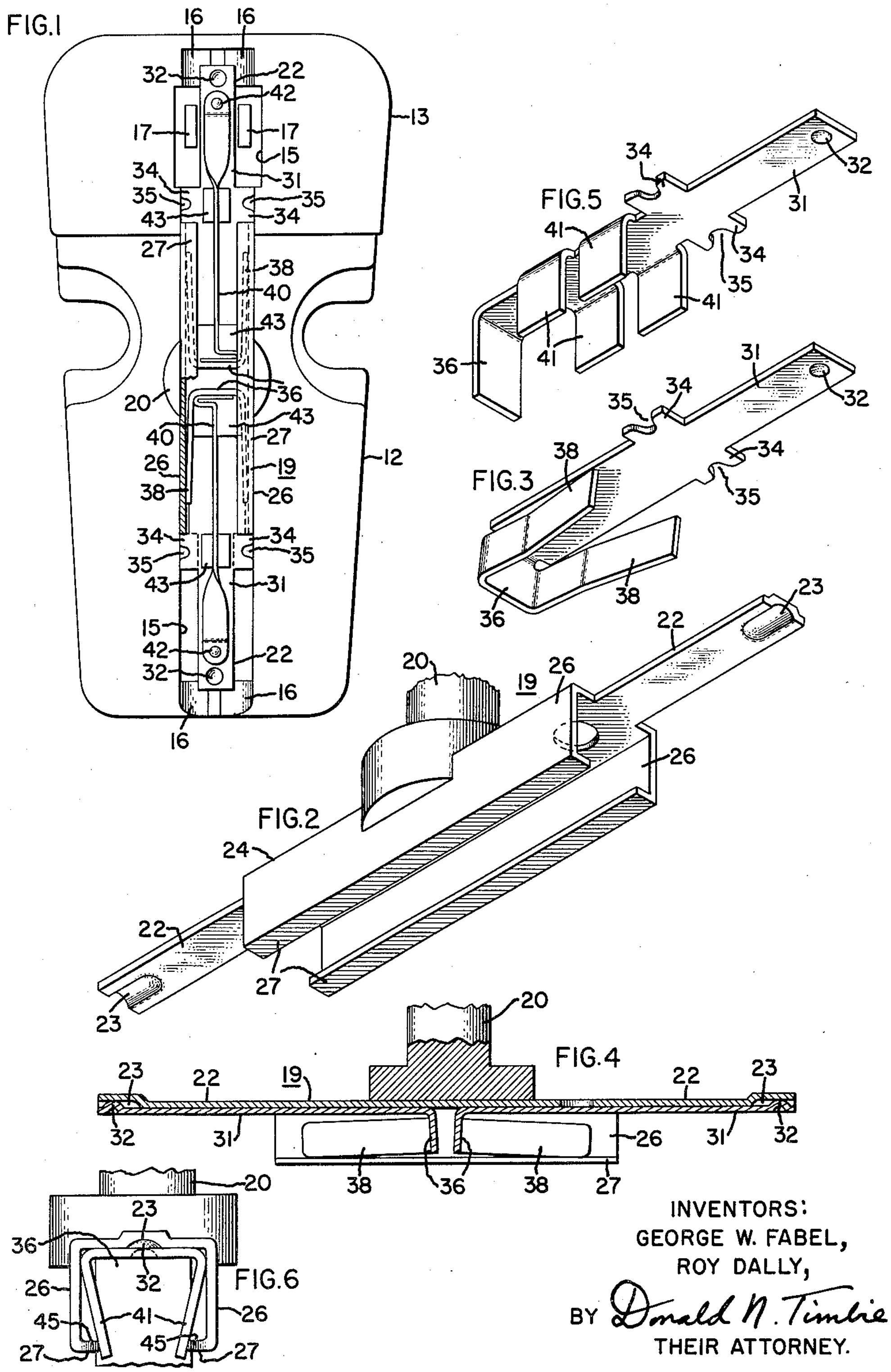

This invention relates to improved channel and replaceable stylus assemblies for phonograph pickup heads of the variable reluctance type.

In Patent No. 2,820,853 to Roy Dally, and Patent No. 2,820,854 to Mark E. Woodworth, both of which are assigned to the assignee of the present invention, there are disclosed replaceable stylus assemblies for phonograph pickups of the reluctance type. In the devices disclosed in these applications a channel-shaped assembly is provided between pole pieces of the pickup or cartridge. The channel assembly and the stylus assembly that mounts in the channel assembly are such that the stylus assembly can be replaceably mounted into the channel-shaped assembly very readily by means of one's fingers. Thus, when a stylus in a stylus assembly wears out, the stylus assembly can be replaced by anyone; i.e. a skilled technician is not required to replace it.

The present invention is an improvement over the above-mentioned type of channel and replaceable stylus assemblies. It includes means for more positively positioning the channel assembly between the pole pieces of the pickup; means for more positively locating the replaceable or slide-in stylus assembly in the channel assembly; and means on the slide-in stylus assembly for permitting more ready withdrawal of the stylus assembly. These features provide a more stable positioning for the stylus and ensure that the stylus is accurately located between the pole pieces. This latter advantage is especially important when a new stylus assembly is being inserted. In addition to the above-mentioned advantages, this improved stylus assembly can be more easily replaced than the former assemblies.

Accordingly, an object of the present invention is to provide a channel assembly that has positive positioning with the pickup head.

Another object is to provide a slide-in stylus assembly that has positive positioning with the channel assembly.

A further object of the present invention is to provide channel and slide-in stylus assemblies that provide stable and accurate positioning of the stylus.

Still another object is to provide a slide-in stylus assembly that is more easy to replace than prior stylus assemblies.

Briefly, in accordance with our invention in one embodiment we provide a channel assembly having an appendage that we call a tongue. The pickup head has trough-like projections into which the tongue seats. Due to the sloping-sides of these projections the tongue can seat in only one position. Therefore, the tongue and thus the channel assembly is positively positioned in the pickup head. The tongue is provided with a detent that coacts with a ball depression on the stylus assembly so that when the stylus assembly is inserted into the channel assembly, the stylus assembly is positively and stably located with respect to the channel assembly. Finger grips on the stylus assembly provide an accessible gripping surface.

The features of our invention that we believe to be novel are set forth with particularity in the appended claims. Our invention itself, however, both as to its organization and method of operation, together with further objects and advantages thereof, may best be understood by reference to the following description taken in connection with the accompanying drawing, in which:

FIG. 1 is a bottom plan view of a dual stylus phonograph pickup embodying our invention, FIG. 2 is a perspective view of the channel assembly of the present invention, FIG. 3 is a perspective view of one embodiment of a stylus assembly, minus the stylus arm and damping blocks, of the present invention, FIG. 4 is a sectional side elevation view of two slide-in stylus assemblies of the FIG. 3 type in the channel assembly of FIG. 2, FIG. 5 is a perspective view of another embodiment of a stylus assembly, minus the stylus arm and damping blocks, of the present invention, and FIG. 6 is an end view of the stylus assembly of FIG. 5 mounted in the channel assembly of FIG. 2.

Referring to FIG. 1, unitary support member 12 contains the magnetic circuit components of the pickup. These components are located within end of member 12 that has a shield 13 surrounding it. A channel-shaped recess 15 extending along the bottom of member 12 has centering projections 16 that form V- or trough-shaped openings. Pole pieces 17 are located on opposite sides of recess 15 near one end.

Referring now to FIG. 2 as well as to FIG. 1, channel assembly 19, which is shaped to fit into recess 15, has a perpendicularly extending post 20 that extends through a centrally-located hole in member 12. Post 20 can be mounted to channel assembly 19 in any suitable manner. Also, the manner in which post 20 is mounted in member 12 is largely discretionary, except that the mounting must provide a rotary action so that either end of channel assembly 19 can be situated between pole pieces 17. In addition, the mounting must be spring biased so that the assembly 19 is urged into recess 15. On both ends of assembly 19 there are tongues 22 that are long enough to fit in the respective centering projections 16. Each tongue 22 is provided with a detent 23 near the end thereof. The main body 24 of channel assembly 19 has a horseshoe-shaped cross-section formed by walls 26 and lips 27.

Referring now to FIGS. 1 and 3, one embodiment of stylus assembly is shown to comprise a base 31 at one end of which a detent means such as a ball depression 32 is located. A stop element 34 extending transversely to base 31 limits movement of the stylus assembly when it is inserted into channel assembly 19. In stop means 34 there are grooves 35 that provide means whereby the stylus assembly can be gripped by one's fingers. At the other end of base 31 a tab 36 extends at an angle of slightly over 90 degrees. Expansible members 38 extend from both sides of tab 36.

The stylus arm shown extending from tab 36 in FIG. 1 is not shown in FIG. 3 in order that the other structure of the stylus assembly can be clearly viewed. In the illustrated stylus arrangement, stylus 42 is mounted near the free end of arm 40, and damping blocks 43 are suitably located around this arm. The specific stylus arm and damping block arrangement is not pertinent to the present invention and that which is shown is merely illustrative of a suitable type.

A better illustration of the manner in which the stylus assembly of FIG. 3 mounts in the channel assembly of FIG. 2 is shown in FIG. 4. Expansible members 38 compress when they meet the sides 26 of the channel assembly 19. Also, these members extend downwardly to contact the lips 27 of the channel assembly, due to the greater than 90 degree angle between the tab 36 and the base 31. This contact causes tab 36 to come closer to a perpendicular relationship with base 31. The force produced by movement of tab 36 provides a spring action down on lips 27. Due to side and lip contact by members 38 there is practically no relative movement between the stylus and channel assemblies. The ball depression 32 of the stylus assembly engages the detent 23 of the channel assembly and thereby locates the stylus assembly with respect to the channel assembly. It also locates the stylus with respect to the pole pieces 17 for, as previously mentioned, the channel assembly 19 is positioned between these pole pieces by the action of tongue 22 on projections 16.

In FIG. 5 another stylus assembly is shown. Again the stylus arm and damping blocks are not shown in order to make the drawing clearer. The main difference between the stylus assembly of FIG. 5 and that of FIG. 3 is that in the former, four springs 41 are used instead of the two springs 38 of the latter. Springs 41 provide a four-point contact that is advantageous in preventing wobble between the stylus and channel assemblies. When the stylus assembly of FIG. 5 is inserted into the channel assembly the springs 41 are compressed by walls 26 and lips 27 of the channel assembly and thereby provide frictional engagement between the channel and stylus assemblies.

As can be seen from FIG. 6, the stylus embodiment of FIG. 5 does not cooperate with channel assembly 19 in the same manner as does the stylus assembly of FIG. 3. The springs 41 are longer than the walls 26, and so extend below lips 27. Thus, these springs are not contained entirely within the channel assembly as are the springs of the FIG. 3 embodiment. Springs 41 therefore bear against lips 27 in a direction that is more sidewards than downwards. To provide for ready insertion of the stylus assembly the front part 45 of the lips 27 can be bevelled.

In summary, stylus and channel assemblies have been disclosed for providing an accurate and stable positioning of a stylus in a phonograph pickup. This result is obtained from a plurality of cooperating features. The channel assembly is accurately located in the pickup through the use of means on the channel assembly that engage with trough-like projections on the pickup. In addition, means on the channel and stylus assemblies interfit to provide a stable and positive location of the stylus assembly in the channel assembly. An additional feature is finger grips on the stylus assembly to permit ready withdrawal thereof.

Although the invention has been described by reference to particular embodiments thereof, it will be understood that numerous modifications can be made by those skilled in the art without departing from the invention. We therefore, aim in the appended claims to cover all such equivalent variations as come within the true spirit and scope of our invention.

What we claim as new and desire to secure by Letters Patent of the United States is:

1. In a phonograph pickup combination including: a reluctance type cartridge having a channel-shaped recess extending along the bottom thereof, two pole pieces on opposite sides of said recess near one end thereof, trough-like projections at both ends of said recess, a hole extending from the center of said recess perpendicularly through said cartridge; a channel assembly having a post arrangement that fits into said hole of said cartridge for providing rotatable mounting for said channel assembly, a channel having a horseshoe shaped cross-section comprising two parallel walls having inwardly extending lips, means for mounting said post to said channel, a stylus assembly including a base removably insertable into said channel assembly, and expansible members on said stylus assembly for frictionally engaging the walls and lips of said channel when said stylus assembly is inserted into said channel assembly, tongues on both ends of said channel for cooperating with said trough-like projections on said cartridge for providing positive locating of said channel between the pole pieces of said cartridge, each of said tongues having a first detent therein adjacent its extremity and a second detent in said stylus assembly base for cooperating with said detent of said channel for providing positive location of said stylus assembly in said channel assembly.

2. The phonograph pickup combination as defined in claim 1 wherein said expansible members comprise four spring-like members in pairs extending integrally from opposite edges of said base and resiliently engageable with said lips.

3. The phonograph pickup combination as defined in claim 1 wherein said base includes a depending integral resilient tab, and said expansible members are two spring-like members extending integrally from opposite edges of said tab, the lip engaging surface of each of said spring-like members forming a small included angle with said base.

4. In a phonograph pickup combination including: a cartridge having a channel-shaped recess extending along the bottom thereof, V-shaped trough-like projections at one end of said recess, a hole extending from the center of said recess perpendicularly through said cartridge; a channel assembly having a post arrangement that fits into said hole of said cartridge for providing rotatable mounting for said channel assembly, a channel mounted at one end of said post arrangement and comprising two parallel walls with lips extending perpendicularly along the edges thereof, and a stylus assembly for removable insertion into said channel assembly, an integral tongue extending longitudinally from one end of said channel for cooperating with said trough-like projections on said cartridge for providing positive lateral location of said channel with respect to said cartridge, and means integral with said stylus assembly for cooperating with said tongue for providing positive lateral location of said stylus assembly in said channel assembly.

5. In a phonograph pickup combination including: a cartridge having a recess extending along the bottom thereof, centering projections at both ends of said recess, a channel assembly including means for rotatably mounting said channel assembly in the recess of said cartridge, and a stylus assembly for removable insertion into said channel assembly, a tongue on one end of said channel assembly for cooperating with said centering projections for providing a positive placement of said channel assembly in said recess, said tongue having a detent therein, and said stylus assembly having a stylus supported thereby and also having a depression therein in the vicinity of said stylus for cooperating with said detent of said tongue for providing positive lateral location of said stylus with respect to said channel assembly.

6. A channel assembly for use in a phonograph pickup having a replaceable stylus assembly, comprising: a channel having a horseshoe-shaped cross-section and comprising a top wall; two parallel side walls extending perpendicularly from said top wall along opposite edges thereof; two lips extending inwardly and perpendicularly from edges of said side walls, one on each side wall; and a tongue extending from one end of said channel, said tongue having a detent therein adapted to cooperate with said stylus assembly to provide lateral positioning of said stylus assembly.

7. A channel assembly for use in a phonograph pickup having a replaceable stylus assembly, comprising: a channel having walls forming a horseshoe-shaped cross-section; and two tongues, one extending from each end of said channel, each of said tongues having a detent therein adapted to cooperate with said stylus assembly to provide lateral positioning of said stylus assembly.

8. A stylus assembly comprising a base having a ball depression near one end of said base, stop projections extending from opposite sides of said base, finger grips formed by grooves in said projections, a tab extending approximately perpendicular from the end other than said one end of said base, a stylus arrangement connected to said tab, and expansible members extending from said stylus assembly, said expansible members including four spring-like members located in pairs on opposite edges of said base.

9. A phonograph pickup combination comprising: an elongated stylus assembly having a stylus located near an end thereof, an elongated channel member for receiving said stylus assembly, stop means for permitting said stylus assembly to be inserted only partially in said channel member whereby said stylus is external to the channel member, a tongue extending longitudinally from said channel to a point in the vicinity of said stylus, and cooperative detent means in said stylus assembly at said end thereof and in the end of said tongue for providing accurate lateral positioning of said stylus with respect to said channel member.

10. A phonograph pickup combination comprising: an elongated stylus assembly having a stylus near an end thereof, an elongated channel member for receiving said stylus assembly, stop means for permitting said stylus assembly to be inserted only partially in said channel member whereby said stylus is external to the channel member, a tongue extending longitudinally from said channel member to a point beyond said stylus, and cooperative detents in said stylus assembly and in said tongue at the ends thereof beyond the position of said stylus thereby to provide accurate lateral positioning of said stylus with respect to said channel member.

11. A phonograph combination comprising: an elongated channel member having a top portion, side portions respectively depending from the edges of said top portion, and lips extending inwardly from the lower edges of said side portions, and a replaceable stylus assembly for insertion in said channel member and comprising an elongated base with a tab extending downwardly from an end thereof, and two spring-like members extending frontwardly and outwardly from opposite edges of said tab, said tab having an angle of more than 90° with respect to said elongated base whereby said spring-like members are inclined downwardly so as to resiliently engage the inner surfaces of said lips when said stylus assembly is inserted in said channel member.

12. A phonograph pickup combination comprising: an elongated channel member having a top portion, side portions extending downwardly from the edges of said top portion and having lips extending inwardly from the lower edges thereof, and a replaceable stylus assembly comprising an elongated base having one or more spring-like members extending downwardly at each side thereof, said spring-like members being longer than the depth of said two sides of the channel member, whereby said spring-like members are bent inwardly so as to resiliently engage the inner edges of said lip when said stylus assembly is inserted in said channel member.

13. A replaceable stylus assembly for insertion into a channel member having means providing a detent at an end thereof, said stylus assembly comprising an elongated base adapted to be inserted into said channel member, a stylus, and means for supporting said stylus from said base whereby the stylus is positioned near an end of said base, said base being provided with detent means at said end thereof adapted to engage said detent of the channel member for providing accurate lateral positioning of said stylus with respect to said channel member.

14. A replaceable stylus assembly for insertion into a channel member having means providing a detent therein, said stylus assembly comprising an elongated base having resilient wing members extending from an end thereof and adapted to be inserted into said channel member, and an elongated armature supported from said base at said end thereof, said armature extending alongside said base and having a stylus at the other end thereof, said base being provided with detent means in the vicinity of said stylus adapted to engage said detent of the channel member for providing accurate lateral positioning of said stylus with respect to said channel member.

References Cited in the file of this patent

UNITED STATES PATENTS

| | | |
|---|---|---|
| 2,554,208 | Peterson et al. | May 22, 1951 |
| 2,742,295 | Frederick | Apr. 17, 1956 |
| 2,793,254 | Wood | May 21, 1957 |
| 2,820,853 | Dally | June 21, 1958 |
| 2,820,854 | Woodworth | June 21, 1958 |